US009690780B2

(12) United States Patent
Davidse et al.

(10) Patent No.: US 9,690,780 B2
(45) Date of Patent: Jun. 27, 2017

(54) DOCUMENT TRANSLATION BASED ON PREDICTIVE USE

(71) Applicant: International Business Machines Corporation, Armonk, NY (US)

(72) Inventors: Jenny Davidse, Winchester (GB); Andrew D. Humphreys, Hampshire (GB); Martin G. Keen, Cary, NC (US); Caroline S. C. McNamara, Winchester (GB); John J. P. McNamara, Winchester (GB)

(73) Assignee: International Business Machines Corporation, Armonk, NC (US)

( * ) Notice: Subject to any disclaimer, the term of this patent is extended or adjusted under 35 U.S.C. 154(b) by 46 days.

(21) Appl. No.: 14/285,687

(22) Filed: May 23, 2014

(65) Prior Publication Data

US 2015/0339293 A1    Nov. 26, 2015

(51) Int. Cl.
*G06F 17/28* (2006.01)
(52) U.S. Cl.
CPC ................................. *G06F 17/289* (2013.01)
(58) Field of Classification Search
None
See application file for complete search history.

(56) References Cited

U.S. PATENT DOCUMENTS

| 6,857,022 | B1 | 2/2005 | Scanlon | |
|---|---|---|---|---|
| 7,292,987 | B2 | 11/2007 | Flanagan et al. | |
| 8,468,149 | B1* | 6/2013 | Lung | G06Q 50/01 707/713 |
| 2004/0039563 | A1* | 2/2004 | Suzuki | G06F 17/2872 704/2 |
| 2006/0217961 | A1* | 9/2006 | Masuichi | G06F 17/2809 704/3 |
| 2011/0270672 | A1* | 11/2011 | Hillard | G06Q 30/02 705/14.42 |
| 2012/0016655 | A1 | 1/2012 | Travieso et al. | |
| 2012/0245921 | A1* | 9/2012 | Huang | G06F 3/0484 704/3 |
| 2014/0052702 | A1* | 2/2014 | Fierro | G06F 8/65 707/695 |

* cited by examiner

*Primary Examiner* — Vincent Rudolph
*Assistant Examiner* — Richa Mishra
(74) *Attorney, Agent, or Firm* — Daniel R. Simek (57) ABSTRACT

In a method for document analysis, receiving a request to translate a document, identifying usage information corresponding to the document, wherein the usage information includes information corresponding to a current viewing session of the document and historical usage information corresponding to one or more previous viewing sessions of the document, and determining one or more sections of the document to translate based on the identified usage information corresponding to the document.

17 Claims, 3 Drawing Sheets

DOCUMENT TRANSLATION BASED ON PREDICTIVE USE

FIELD OF THE INVENTION

The present invention relates generally to the field of document translation, and more particularly to translating documents based on predictive use.

BACKGROUND

A translation service or a translation application can be utilized to translate documents from one language to another. Computer-assisted translation (CAT), also called "computer-aided translation," "machine-aided human translation" (MAHT) and "interactive translation," is a form of translation wherein a human translator creates a target text with the assistance of a computer program. Machine translation (MT) is a process whereby a computer program analyzes a source text and, in principle, produces a target text without human intervention. Machine translation may also involve human intervention, in the form of pre-editing and/or post-editing. Another form of machine translation is statistical machine translation (SMT). In SMT, translations are generated on the basis of statistical models whose parameters are derived from the analysis of bilingual text corpora. The approach of SMT differs from rule-based approaches to machine translation.

SUMMARY

Aspects of the present invention disclose a method, computer program product, and system for document analysis. The method includes one or more processors receiving a request to translate a document. The method further includes one or more processors identifying usage information corresponding to the document, wherein the usage information includes information corresponding to a current viewing session of the document and historical usage information corresponding to one or more previous viewing sessions of the document. The method further includes one or more processors determining one or more sections of the document to translate based on the identified usage information corresponding to the document.

DETAILED DESCRIPTION

Embodiments of the present invention allow for translation of sections of a document based on usage information corresponding to current and historical usage statistics. In one embodiment, in response to receiving a request to translate a document, a first section is translated. Then, usage information corresponding to current and historical usage statistics are determined and utilized to determine one or more additional sections to translate.

Some embodiments of the present invention recognize that translation services and applications can take a long time to translate documents. Additionally, translation services can require an indication in advance of sections of a document that are going to be translated, which can lead to translating sections of a document that will not be used. Utilizing translation services and applications for large technical documents can lead to complications, particularly in documents that utilize a hierarchical format.

Figure 1:
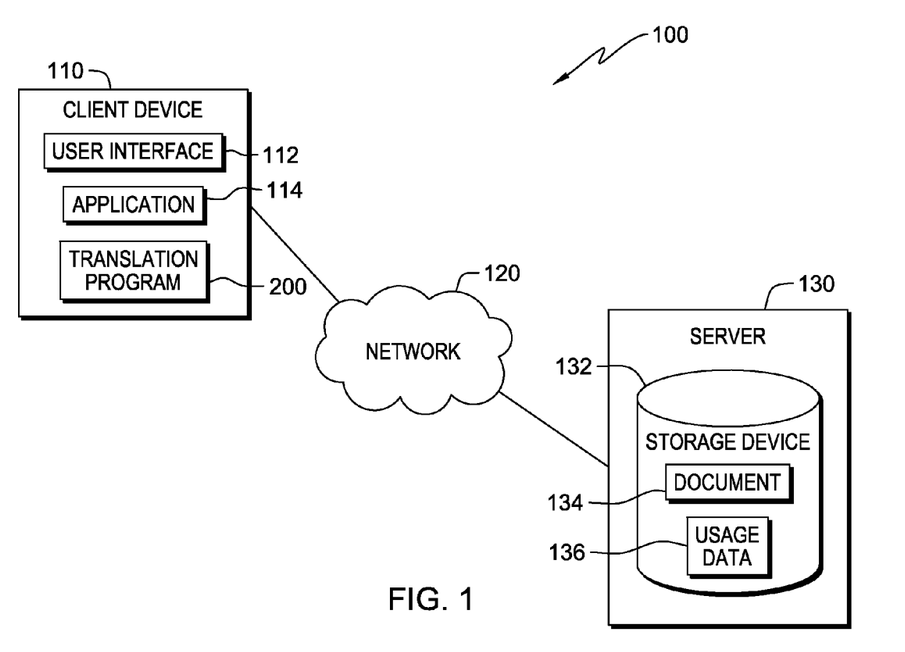
FIG. 1 is a functional block diagram of a data processing environment in accordance with an embodiment of the present invention.

The present invention will now be described in detail with reference to the Figures. FIG. 1 is a functional block diagram illustrating a distributed data processing environment 100, in accordance with one embodiment of the present invention.

An embodiment of data processing environment 100 includes client device 110 and server 130, interconnected over network 120. In an example embodiment, client device 110 can communicate with server 130, via network 120, to access information that is stored on server 130 (e.g., document 134).

In various embodiments of the present invention, client device 110 may be a workstation, personal computer, personal digital assistant, mobile phone, or any other device capable of executing computer readable program instructions in accordance with embodiments of the present invention. In general, client device 110 is representative of any electronic device or combination of electronic devices capable of executing computer readable program instructions. Client device 110 may include components as depicted and described in further detail with respect to FIG. 3, in accordance with embodiments of the present invention.

Client device 110 includes user interface 112, application 114, and translation program 200. User interface 112 accepts input from users of client device 110. In example embodiments, a user (through input via user interface 112) of client device 110 can utilize application 114 to communicate with server 130, via network 120. In an example, application 114 can be a web browser that a user of client device 110 can use to access and utilize document 134, which is located on server 130. In other embodiments, application 114 is any type of application that a user of client device 110 can use to view and navigate through documents on sever 130, and is capable of communicating with translation program 200. Translation program 200 allows for translation of sections of a document based on usage information corresponding to current and historical usage statistics, in accordance with embodiments of the present invention.

In one embodiment, client device 110 and server 130 communicate through network 120. Network 120 can be, for example, a local area network (LAN), a telecommunications network, a wide area network (WAN) such as the Internet, or any combination of the three, and include wired, wireless, or fiber optic connections. In general, network 120 can be any combination of connections and protocols that will support communications between client device 110 and server 130 in accordance with embodiments of the present invention.

In example embodiments, server 130 can be a desktop computer, computer server, or any other computer system known in the art. In certain embodiments, server 130 represents computer systems utilizing clustered computers and components (e.g., database server computers, application server computers, etc.) that act as a single pool of seamless resources when accessed by elements of data processing environment 100 (e.g., client device 110). In general, server 130 is representative of any electronic device or combination of electronic devices capable of executing computer readable program instructions. Server 130 may include components as depicted and described in further detail with respect to FIG. 3, in accordance with embodiments of the present invention.

Server 130 includes storage device 132, which contains document 134 and usage data 136. In one embodiment, server 130 is a component of an information center, which stores a plurality of documents that can be arranged in a hierarchical format. For example, document 134 is one of a plurality of text documents that are stored on server 130. Storage device 132 can be implemented with any type of storage device, for example, persistent storage 308, which is capable of storing data that may be accessed and utilized by client device 110, and server 130, such as a database server, a hard disk drive, or flash memory. In other embodiments, storage device 132 can represent multiple storage devices within server 130.

In an example embodiment, document 134 is a text document with multiple sections arranged in a hierarchical format (e.g., including sections that are associated with, and depend upon other sections within the document). A section of a document can be one or more pages, or partial pages, of document 134, and can be organized by related information. In an example embodiment, sections of document 134 include is HyperText Markup Language (HTML), which translation program 200 can utilize to identify groupings of text that correspond to sections of document 134.

Usage data 136 includes information about historical usage and translation history of documents that are stored on server 130. Instances of usage data within usage data 136 are associated with the corresponding document in server 130 and the corresponding client device that was utilizing the document. For example, an instance of usage data 136 provides historical usage information corresponding to client device 110 utilizing document 134, and is associated with client device 110 and document 134.

In other embodiments, storage device 132 can include previously translated sections of a document, associated with the corresponding document. For example, if translation program 200, or another translation application or method (not pictured), has previously translated one or more sections of document 134, the one or more previously translated sections of document 134 (e.g., including an association with document 134, an indication of the language of the translation, etc.) are stored on storage device 132. In another embodiment, translation program 200 can be located on server 130, and client device 110 is capable of accessing and utilizing translation program 200 on server 130 (e.g., via application 114 through network 120).

In an example embodiment, usage data 136 includes previous personal usage of a document associated with a client device (e.g., previous usage of document 134 by client device 110). Previous personal usage can include historical navigation paths of a user (e.g., client device 110, a user profile on client device 110, etc.) through a document, or a series of documents on server 130. In another example embodiment, usage data 136 includes usage probability statistics relating to sections of documents. The usage probability statistics include statistical information on navigation paths taken through sections of documents in server 130 (e.g., navigation path through documents and topics in an information center). For example, usage probability statistics can indicate that 83% of users of document 134 that view section 4.1 subsequently view section 4.2. In other example embodiments, usage data 136 can include additional information based on historical or current usage of documents on server 130.

Figure 2:
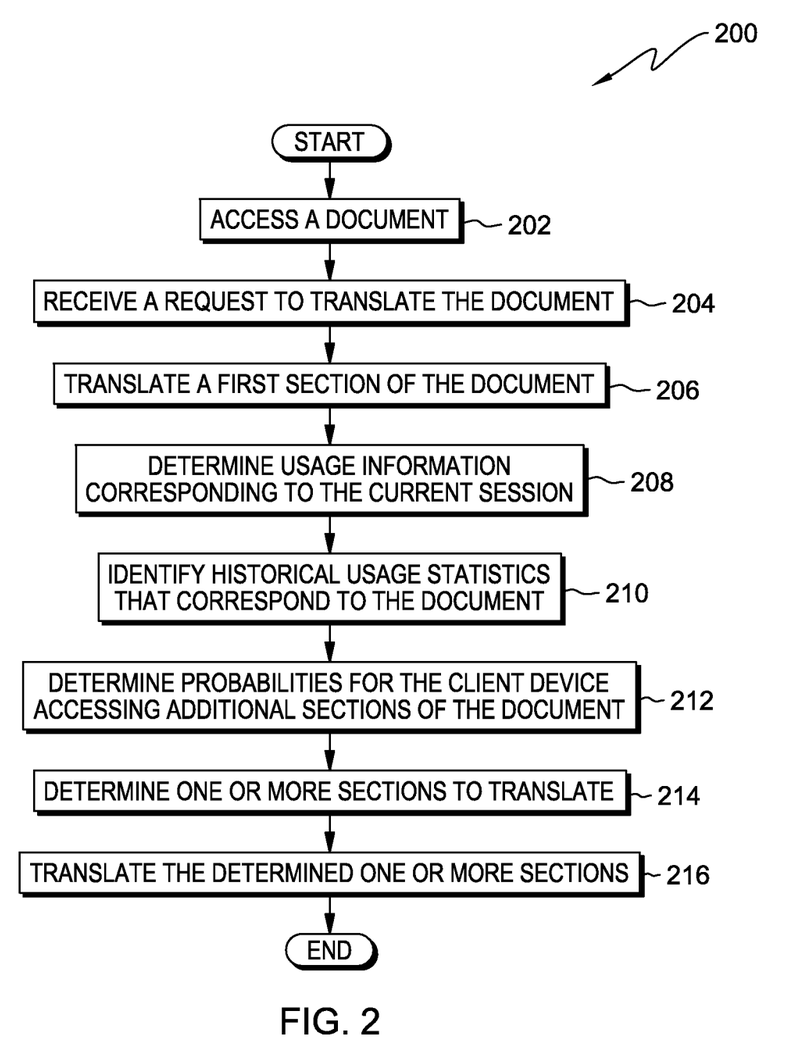
FIG. 2 is a flowchart depicting operational steps of a program for translating sections of a document based on usage information corresponding to current and historical usage statistics, in accordance with an embodiment of the present invention.

FIG. 2 is a flowchart depicting operational steps of translation program 200, a program for translating sections of a document based on usage information corresponding to current and historical usage statistics, in accordance with an embodiment of the present invention. In one embodiment, translation program 200 initiates in response to client device 110 accessing a document (e.g., document 134 on server 130). In another embodiment, translation program 200 can initiate in response to client device navigating to a new section in a document (e.g., document 134 on server 130).

In step 202, translation program 200 accesses a document. In one embodiment, in response to a user of client device 110 accessing document 134 on server 130 (via application 114), translation program 200 accesses document 134. In an example embodiment, translation program 200 accesses document 134, which is a text document that includes multiple sections arranged in a hierarchical format, and is stored on an information center server (i.e., server 130).

In step 204, translation program 200 receives a request to translate the document. In one embodiment, translation program 200 receives a request to translate document 134 from client device 110 (e.g., via input from a user of client device 110 into user interface 112).

In step 206, translation program 200 translates a first section of the document. In one embodiment, translation program 200 translates the section of document 134 that client device 110 is accessing when providing the request to translate document 134 to a language specified by client device 110. In various embodiments, the first section can be a section of document 134 that is being displayed to client device 110 (e.g., section of document 134 displayed in application 114), a page of document 134, a numbered section of document 134 (e.g., section 4.1, etc.), or other selections of text in document 134. In other embodiments, translation program 200 can provide translations of sections of document 134 that have been previously translated and are stored in storage device 132.

In step 208, translation program 200 determines usage information corresponding to the current session. More specifically, translation program 200 determines usage information based on the manner in which client device 110 is currently accessing the document. In various embodiments, the determined usage information includes a current mode of usage and patterns of use. The current mode of usage includes how a user is currently interacting with the document (e.g., document 134 via application 114). For example, the mode of usage can provide an indication that client device 110 is scrolling through document 134 slowly and methodically, which can indicate that the user has a high probability of continuing reading document 134. The patterns of usage can include indications of sections of document that a user (e.g., client device 110) has previously viewed in the current viewing session. For example, if client device 110 has previously viewed sections of document 134 relating to creating a database and creating a table in a database, then client device 110 can have an increased probability of accessing a section of document 134 relating to populating a table in a database with data. In example embodiments, translation program 200 can determine patterns of usage utilizing a table of contents of document 134, which provides indications of which sections of document 134 are associated with other sections of document 134. In other embodiments, the determined usage information can be included or stored in usage data 136.

In step 210, translation program 200 identifies historical usage statistics that correspond to the document. In one embodiment, translation program 200 identifies information and statistics in usage data 136 that correspond to document 134. In example embodiments, translation program 200 identifies historical usage statistics that include previous personal usage and usage probability statistics of usage data 136 that correspond to the document accessed in step 202.

In step 212, translation program 200 determines probabilities for the client device accessing additional sections of the document. In one embodiment, translation program 200 determines and assigns probabilities for client device 110 accessing the additional sections of document 134 based on one or more factors, which can include, but are not limited to: the determined usage information corresponding to the current session (from step 208), the identified historical usage statistics that correspond to the document (from step 210), a table of contents of document 134 (i.e., interrelationship of sections within document 134), cultural information (e.g., dependent on languages involved in the translation), browsing history of document 134, as well as, other factors relating to document 134. In one example, translation program 200 determines a probability based on a weighted average of the one or more factors. In another example, translation program 200 determines and assigns probabilities for client device 110 accessing the additional sections of document 134 to be a probability associated with the usage probability statistics of usage data 136 that correspond to the additional sections of the document (e.g., statistics indicating that 87% of users of document 134 that view section 3.1 subsequently view section 3.2). Translation program 200 determines probabilities that provide a statistical view of the next sections of document 134 to most likely be accessed by client device 110. In an example embodiment, translation program 200 determines a probability corresponding to each additional section document 134 (other than the section that client device 110 currently accessing).

In step 214, translation program 200 determines one or more sections to translate. More specifically, translation program 200 determines one or more sections of document 134 to translate based on the determined probabilities (from step 212) for the additional sections of document 134. In one embodiment, translation program 200 determines the sections of document 134 that have a corresponding determined probability (from step 212) that is greater than a threshold condition (e.g., 65%) as the one or more section(s) to translate. In another embodiment, translation program 200 determines the sections of document 134 with the highest corresponding determined probability (e.g., the five sections with the highest probabilities) as the one or more sections to translate. In additional embodiments, translation program 200 can utilize other factors to determine the one or more sections of document 134 to translate based on the determined probability (from step 212), and other information associated with client device 110 and document 134.

In step 216, translation program 200 translates the determined one or more sections. More specifically, translation program 200 translates the determined one or more sections of document 134 (from step 216) into a language specified by client device 110. In one embodiment, translation program 200 also stores the translated sections in storage device 132.

In one example, in response to receiving a request from client device 110 to translate document 134 on server 130 (step 204), translation program 200 translates the section of document that client device 110 is currently accessing (step 206) to a language indicated in the received request. In this example, translation program 200 provides a translation of section 3.1 of document 134 to client device 110. In another embodiment, translation program 200 identifies a previously translated instance of section 3.1 of document 134 in storage device 132 that corresponds to the received request, and then translation program 200 provides the identified translation to client device 110.

Then, translation program 200 determines usage information that corresponds to the current session of client device 110 viewing document 134 (step 208). In this example, translation program 200 determines usage information that indicates that client device 110 is slowly scrolling through of document 134 (i.e., a determined mode of usage of document 134). Then, translation program 200 identifies historical usage statistics that correspond to document 134 (step 210). In this example, translation program 200 accesses instances of usage data 136 on storage device 132 that corresponds to client device 110 and document 134. Translation program 200 identifies previous personal usage of client device 110 utilizing document 134 that includes information indicating that client device 110 has previously navigated in document 134 from section 3.1 to sections 3.2, 3.3, 3.8, 4.5, and 5.0. Additionally, translation program 200 identifies usage probability statistics corresponding to document 134 that include probability statistics information on navigation paths through sections of document 134. The identified usage probability statistics include statistics indicating that 87% of users of document 134 that view section 3.1 subsequently view section 3.2, 83% of users that view section 3.1 subsequently view section 3.3, 70% of users that view section 3.1 subsequently view section 3.8, and 42% of users that view section 3.1 subsequently view section 4.5.

Then, translation program 200 determines probabilities for client device 110 accessing additional sections of document 134 (step 212). In this example, translation program 200 determines a probability corresponding to each additional section document 134 (other than the section that client device 110 is currently accessing). Translation program 200 determines and assigns probabilities for client device 110 accessing the additional sections of document 134 based on multiple factors, which include: the determined usage information corresponding to the current session (from step 208), the identified historical usage statistics that correspond to the document (from step 210), and other usage factors that relate to client device 110 and document 134. In this example, translation program 200 determines probabilities that provide a statistical view of the most likely next sections to document 134 to be accessed viewed by client device 110, which include an 89% probability for section 3.2, an 85% probability for section 3.3, a 70% probability for section 3.8, and a 49% probability for section 4.5. In one example embodiment, translation program 200 utilizes the usage probability statistic that 70% of users that view section 3.1 subsequently view section 3.8 as the probability in the statistical view corresponding to section 3.8 (i.e., a 70% probability for section 3.8). In another example embodiment, determines the probability for section 3.2 utilizing a weighted average based on the usage probability statistic indicating that 87% of users of document 134 that view section 3.1 subsequently view section 3.2, a probability associated with a determined mode of usage of document 134, and probabilities associated with previous personal usage of client device 110 utilizing document 134.

Then, translation program 200 utilizes the determined probabilities (from step 212) to determine one or more sections to translate (step 214). Translation program 200 compares the determined probabilities to a predefined minimum threshold condition of a 60% probability. In this example, translation program 200 determines to translate sections 3.2, 3.3, and 3.8 (which have over a 60% probability), and not to translate section 4.5 (which have less than 60% probability). Then, translation program 200 translates the determined one or more sections (step 216). In this example, translation program 200 translates sections 3.2, 3.3, and 3.8 of document 134, and provides the translations to client device 110. In another embodiment, translation program 200 stores the translations of sections 3.1, 3.2, 3.3, and 3.8 of document 134 associated with document 134 (e.g., stored in storage device 132). In an additional embodiment, in response to client device 110 navigating to another section of document 134 (i.e., other than section 3.1), translation program 200 initiates as step 204.

Figure 3:
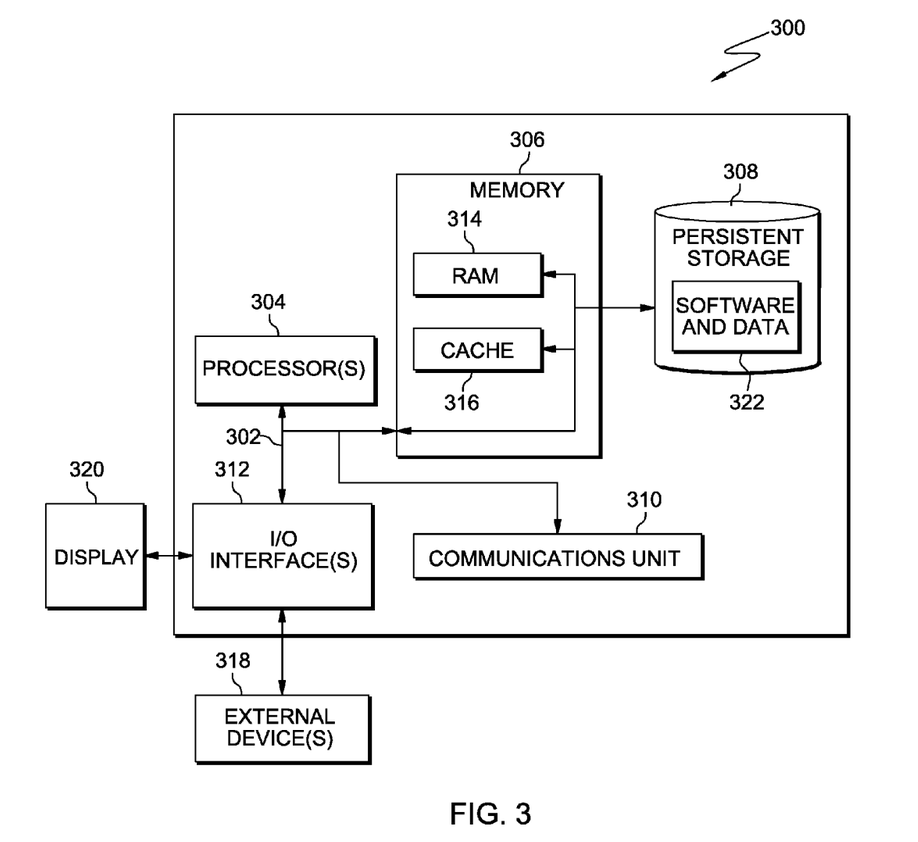
FIG. 3 depicts a block diagram of components of a computing system representative of the client device and server of FIG. 1 in accordance with an embodiment of the present invention.

FIG. 3 depicts a block diagram of components of computer 300, which is representative of client device 110 and server 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 406 can include any suitable volatile or non-volatile computer readable storage media. Software and data 322 are stored in persistent storage 308 for access and/or execution by processors 304 via one or more memories of memory 306. With respect to client device 110, software and data 322 includes application 114 and translation program 200. With respect to server 130, software and data 322 includes document 134 and usage data 136.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 may include one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for document analysis, the method comprising:

receiving, by one or more processors, a request to translate a document;

determining, by one or more processors, usage information corresponding to the document, wherein the usage information includes information corresponding to a current viewing session of the document for a user, and a mode of usage corresponding to the current viewing session of the document, the mode of usage indicating user activity that corresponds to how the user is currently interacting with the document in the current viewing session of the document, and the mode of usage indicating at least a speed at which the user is scrolling through the document, and wherein the usage information includes historical usage information corresponding to one or more previous viewing sessions of the document; and determining, by one or more processors, one or more sections of the document to translate based on the determined usage information corresponding to the document, wherein the determining one or more sections of the document to translate based on the determined usage information corresponding to the document, further comprises:

determining, by one or more processors, a probability corresponding to each section of the one or more sections of the document that indicate the probability that a user will access and view a respective section of the document, wherein the probabilities are determined based on at least: the determined usage information corresponding to the document, data indicating relationships of sections of the document, and browsing history of the document; and determining, by one or more processors, the one or more sections of the document to translate, wherein the one or more sections of the document to translate each have a determined corresponding probability exceeding a minimum threshold condition.

2. The method of claim 1, wherein determining one or more sections of the document to translate based on the determined usage information corresponding to the document, further comprises:

identifying, by one or more processors, a section of the document that is being accessed at the time the request to translate the document is received;

translating, by one or more processors, the identified section of the document;

determining, by one or more processors, one or more additional sections of the document to translate based on the determined usage information corresponding to the document; and translating, by one or more processors, the determined one or more additional sections of the document.

3. The method of claim 1, wherein the information corresponding to a current viewing session of the document includes patterns of usage corresponding to the current session.

4. The method of claim 1, wherein the historical usage information corresponding to previous viewing sessions of the document includes previous usage information associated with a current user of the document and statistical information indicating previous navigation paths through sections of the document taken by previous users of the document.

5. The method of claim 1, further comprising:
translating, by one or more processors, the determined one or more sections of the document.

6. The method of claim 1, further comprising:
identifying, by one or more processors, previously translated instances of at least one of the one or more determined sections of the document; and
providing, by one or more processors, the identified previously translated instances of at least one of the one or more determined sections of the document.

7. A computer program product for document analysis, the computer program product comprising:
one or more computer readable storage media and program instructions stored on the one or more computer readable storage media, the program instructions comprising:
program instructions to receive a request to translate a document;
program instructions to determine usage information corresponding to the document,
wherein the usage information includes information corresponding to a current viewing session of the document for a user, and a mode of usage corresponding to the current viewing session of the document, the mode of usage indicating user activity that corresponds to how the user is currently interacting with the document in the current viewing session of the document, and the mode of usage indicating at least a speed at which the user is scrolling through the document, and
wherein the usage information includes historical usage information corresponding to one or more previous viewing sessions of the document; and
program instructions to determine one or more sections of the document to translate based on the determined usage information corresponding to the document,
wherein the program instructions to determine one or more sections of the document to translate based on the determined usage information corresponding to the document, further comprise program instructions to:
determine a probability corresponding to each section of the one or more sections of the document that indicate the probability that a user will access and view a respective section of the document, wherein the probabilities are determined based on at least: the determined usage information corresponding to the document, data indicating relationships of sections of the document, and browsing history of the document; and
determine the one or more sections of the document to translate, wherein the one or more sections of the document to translate each have a determined corresponding probability exceeding a minimum threshold condition.

8. The computer program product of claim 7, wherein the program instructions to determine one or more sections of the document to translate based on the determined usage information corresponding to the document, further comprise program instructions, stored on the one or more computer readable storage media, to:
identify a section of the document that is being accessed at the time the request to translate the document is received;
translate the identified section of the document;
determine one or more additional sections of the document to translate based on the determined usage information corresponding to the document; and
translate the determined one or more additional sections of the document.

9. The computer program product of claim 7, wherein the information corresponding to a current viewing session of the document includes patterns of usage corresponding to the current session.

10. The computer program product of claim 7, wherein the historical usage information corresponding to previous viewing sessions of the document includes previous usage information associated with a current user of the document and statistical information indicating previous navigation paths through sections of the document taken by previous users of the document.

11. The computer program product of claim 7, further comprising program instructions, stored on the one or more computer readable storage media, to:
translate the determined one or more sections of the document.

12. The computer program product of claim 7, further comprising program instructions, stored on the one or more computer readable storage media, to:
identify previously translated instances of at least one of the one or more determined sections of the document; and
provide the identified previously translated instances of at least one of the one or more determined sections of the document.

13. A computer system for document analysis, the computer system comprising:
one or more computer processors;
one or more computer readable storage media; and
program instructions stored on the computer readable storage media for execution by at least one of the one or more processors, the program instructions comprising:
program instructions to receive a request to translate a document;
program instructions to determine usage information corresponding to the document,
wherein the usage information includes information corresponding to a current viewing session of the document for a user, and a mode of usage corresponding to the current viewing session of the document, the mode of usage indicating user activity that corresponds to how the user is currently interacting with the document in the current viewing session of the document, and the mode of usage indicating at least a speed at which the user is scrolling through the document, and wherein the usage information includes historical usage information corresponding to one or more previous viewing sessions of the document; and program instructions to determine one or more sections of the document to translate based on the determined usage information corresponding to the document, wherein the program instructions to determine one or more sections of the document to translate based on the determined usage information corresponding to the document, further comprise program instructions to:

determine a probability corresponding to each section of the one or more sections of the document that indicate the probability that a user will access and view a respective section of the document, wherein the probabilities are determined based on at least: the determined usage information corresponding to the document, data indicating relationships of sections of the document, and browsing history of the document; and determine the one or more sections of the document to translate, wherein the one or more sections of the document to translate each have a determined corresponding probability exceeding a minimum threshold condition.

14. The computer system of claim 13, wherein the program instructions to determine one or more sections of the document to translate based on the determined usage information corresponding to the document, further comprise program instructions, stored on the computer readable storage media for execution by at least one of the one or more processors, to:

identify a section of the document that is being accessed at the time the request to translate the document is received;

translate the identified section of the document;

determine one or more additional sections of the document to translate based on the determined usage information corresponding to the document; and translate the determined one or more additional sections of the document.

15. The computer system of claim 13, wherein the information corresponding to a current viewing session of the document includes patterns of usage corresponding to the current session.

16. The computer system of claim 13, wherein the historical usage information corresponding to previous viewing sessions of the document includes previous usage information associated with a current user of the document and statistical information indicating previous navigation paths through sections of the document taken by previous users of the document.

17. The computer system of claim 13, further comprising program instructions, stored on the computer readable storage media for execution by at least one of the one or more processors, to:

translate the determined one or more sections of the document.

* * * * *